Jan. 24, 1961 R. S. GAUGLER 2,969,515
DOMESTIC APPLIANCE
Filed June 19, 1959 2 Sheets-Sheet 1
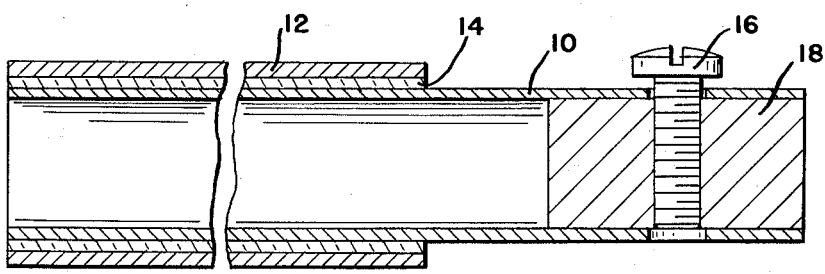
Fig. 1
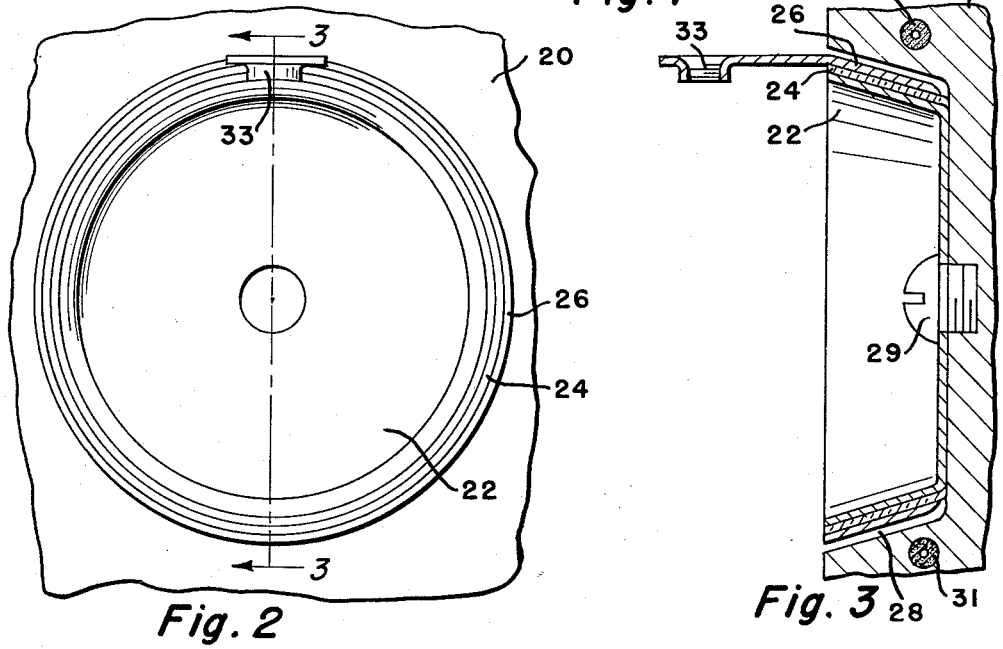
Fig. 2
Fig. 3
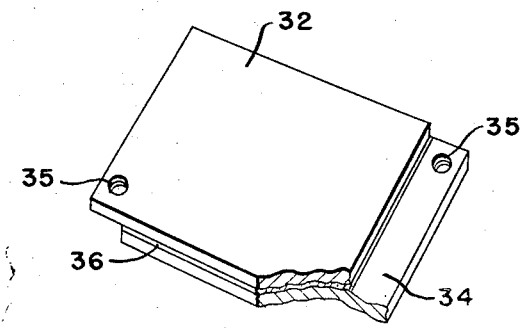
Fig. 4
INVENTOR.
Richard S. Gaugler
BY Edwin S. Dybvig
His Attorney Jan. 24, 1961  R. S. GAUGLER  2,969,515
DOMESTIC APPLIANCE
Filed June 19, 1959  2 Sheets-Sheet 2

INVENTOR.
Richard S. Gaugler
BY
His Attorney

United States Patent Office 2,969,515
Patented Jan. 24, 1961

2,969,515

DOMESTIC APPLIANCE

Richard S. Gaugler, Dayton, Ohio, assignor to General Motors Corporation, Detroit, Mich., a corporation of Delaware Filed June 19, 1959, Ser. No. 821,604

1 Claim. (Cl. 338—25)

This invention relates to a domestic appliance and more particularly to a temperature sensing element for use in controlling the flow of current to a surface unit on an electric range, or the like.

It is an object of this invention to provide a temperature sensing device capable of operating in the temperature range of 700° F. to 1000° F. and even higher without deterioration of the temperature sensing element over prolonged periods of time.

More particularly, it is an object of this invention to provide a temperature sensing element in which the change in electric conductivity of porcelain is used for sensing temperature changes.

Still another object of this invention is to provide a temperature sensing element which may be manufactured at a low cost and may be readily installed and, if necessary, replaced with a minimum amount of expense and inconvenience.

Further objects and advantages of the present invention will be apparent from the following description, reference being had to the accompanying drawings wherein preferred embodiments of the present invention are clearly shown.

In the drawings:

Figure 1 is a vertical sectional view showing one form of temperature sensing element constructed in accordance with my invention.

Figure 2 is a fragmentary plan view of another form of temperature sensing element constructed in accordance with my invention and arranged to sense the temperature of a solid plate type of heating element of an electric range.

Figure 3 is a sectional view taken substantially on line 3—3 of Figure 2.

Figure 4 is a perspective view with parts broken away showing still another form of a temperature sensing element utilizing my invention.

Figure 5:
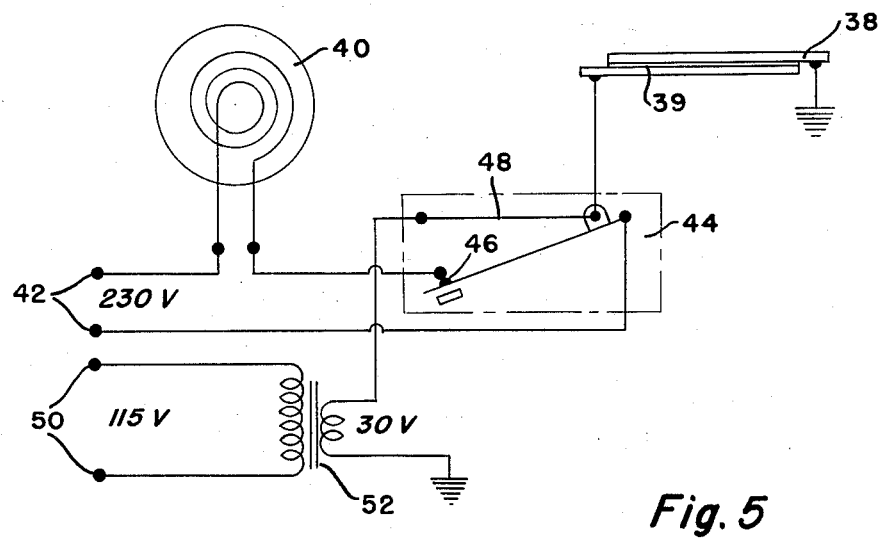
Figure 5 is a schematic circuit diagram showing one application of the invention.

It has been found that a reliable and unusually rugged temperature sensing element capable of operating in the temperature range of 700° F. to 1000° F. and higher can be made by using two pieces of metal such as enameling iron which are separated by porcelain enamel fused to the two pieces of enameling iron. The two pieces are connected in a circuit in such a manner that current is required to pass through the porcelain. The actual shape of the metal pieces may take various forms, as explained hereinafter.

Referring now to Figure 1 of the drawings, there is shown a temperature sensing element which consists of an inner metallic tube 10 and an outer metallic tube 12 surrounding a portion of the inner tube 10 and separated therefrom by means of a layer of porcelain 14 which is fused to the metallic tubes 10 and 12. In order to facilitate the attachment of an electrical lead to the inner tube 10, there is provided a screw 16 which is threaded into an end plug 18 carried within the tube 10, as shown. Electrical contact would be made to the outer tube 12 in any suitable manner so as to cause current to flow from the outer tube 12 through the porcelain layer 14 and, thereafter, through the inner tube 10.

The porcelain enamel used can be a conventional alkali-alkaline earth borosilicate opacified with titanium dioxide, known commercially as Pemco 1199–H, Mill P–265. It has been found that porcelain has a negative temperature coefficient of resistance similar to that of thermistors and that it can be used as a temperature sensing device operating in the temperature range normally encountered in electric ranges and other types of heating elements.

In Figures 2 and 3, there is shown a different physical arrangement of parts of a temperature sensing element suitable for use in sensing the temperature of a range heating element, such as the element 20 shown therein. In this form of the invention, a pan or dish shaped inner metallic element 22 is provided which has its outer periphery coated with a layer of porcelain 24. A metallic band 26 surrounds the outer periphery of the element 22 with the porcelain 24 fused to the elements 22 and 26.

In the form shown in Figures 2 and 3, the heating element 20 has a recess 28 formed in its under side into which the element 26 is inserted with the bottom surface of the element 22 in thermal exchange relationship with the heating element 20. A screw 29 is arranged as shown for attaching the temperature sensing element to the bottom side of the heating element 20. The reference numeral 31 designates a conventional heating wire embedded within the surface heating element 20 and reference numeral 33 designates a tapped opening in a projecting portion formed integrally with the element 26 for use in making an electrical connection to the element 26.

Still another form of the invention is shown in Figure 4 wherein a pair of flat sheet metal stampings 32 and 34 are separated by a layer of porcelain 36 which is fused to the adjacent surfaces of the elements 32 and 34. Tapped openings 35 are provided for receiving conventional terminal screws (not shown).

In each of the forms described hereinabove, the two pieces of metal were first coated with porcelain enamel in the customary manner and the enamel was fired. These two pieces were then placed together in such a manner that the porcelain enamel was sandwiched between the metal pieces and the sandwich was again fired until a bond was obtained between the two pieces.

In Figure 5 of the drawings, there is shown one of the temperature sensing elements 38 of the type shown in Figure 4 used as a temperature limiting device for an electric range surface heating unit designated by the reference numeral 40. While the temperature sensing element 38 has been shown adjacent to but out of contact with the heating element 40 for purposes of illustrating the circuit, one plate thereof would preferably be arranged in direct physical contact with the heating element 40. Current is supplied to the heating unit 40 from a 230-volt source 42 through a hot wire relay, generally designated by the reference numeral 44. The relay 44 includes a switch 46 which is adapted to be opened and closed by means of a conventional hot wire element 48 which expands and contracts in response to variations in the flow of current through the hot wire 48 in accordance with conventional hot wire relay practice. Current for operating the hot wire relay is supplied from a 115-volt source 50 and a step down transformer 52 which is arranged to deliver thirty volts to that portion of the circuit which includes the temperature sensing element 38 and the hot wire 48. The construction and arrangement is such that when the temperature of the surface unit 40 and, consequently, the sensing element 38 reaches 1000° F., the resistance through the porcelain layer 39 of the temperature sensing element drops to 40 ohms and with with the application of thirty volts from the step down transformer, a current of 500 milliamperes will flow through the hot wire relay causing it to open the switch 46 and, thereby, turn off the 230-volt supply to the electric surface unit 40. The resistance of the relay and circuit is 20 ohms. The surface unit then cools down and when the temperature of the sensing element 38 reaches 900° F., the resistance of the porcelain layer will have increased to 240 ohms. This reduces the current through the hot wire relay to 115 milliamperes, at which point, the relay turns on the 230-volt current to the surface heating unit. In this manner, the temperature of the heating unit is held between 900° F. and 1000° F.

Control between different temperature limits and control at different ranges of temperature can be achieved by changing the characteristics of the ceramic layer in the sensing element sandwich.

The sensing element is not limited to use with electric range surface heating units but can be used in many applications where a high temperature sensing or controlling device is needed. The former types of thermistors have a comparatively small change in resistance at these high temperatures and, furthermore, it is difficult to make electrical connections to conventional thermistors that will withstand the high temperatures involved.

A temperature sensing element of the type shown in Figure 4, having a sandwich area of 4 square inches and having a porcelain thickness of .01 inch, will perform in the manner indicated in describing the operation of the apparatus shown in Figure 5.

Figure 6:
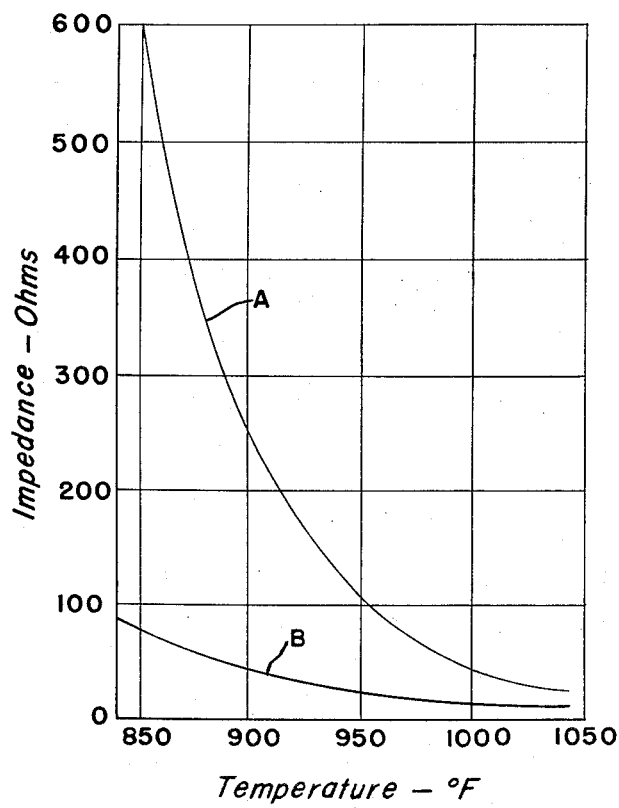
Figure 6 is a chart showing the relationship between temperature and impedance in ohms in temperature sensing devices embodying the invention.

Referring now to Figure 6 of the drawings, the curve A shows the relationship between the impedance and the temperature of devices of the type described hereinabove when using a standard white coat porcelain material of the type used commercially in porcelain refrigerator and range cabinets and known commercially as Pemco 1199–H, Mill P–265.

The curve B in Figure 6 shows the relationship between impedance in ohms and temperature in degrees Fahrenheit of a ceramic material which has been prepared in the manner now to be described. Each of the metallic elements of the sandwich is first coated with a ground coat consisting of the following:

| | Parts (by weight) |
|---|---|
| Feldspar | 27 |
| Borax | 32 |
| Silica | 20 |
| Soda ash | 6 |
| Soda nitrate | 4.5 |
| Fluorspar | 5.2 |
| Cobalt oxide | 0.5 |
| Maganese oxide | 1.2 |

After the ground coat has been fired, a cover coat consisting of the following is applied and fired.

| | Parts (by weight) |
|---|---|
| Feldspar | 29 |
| Borax | 26 |
| Silica | 20 |
| Soda ash | 20 |
| Soda nitrate | 4.5 |
| Potassium nitrate | 3 |
| Cryolite | 3 |
| Zinc oxide | 4 |
| Titanium oxide | 10 |

While the embodiments of the present invention as herein disclosed, constitute preferred forms, it is to be understood that other forms might be adopted.

What is claimed is as follows:

A temperature sensing device comprising a pan shaped metallic element having an integrally formed terminal portion thereon, a metallic band surrounding the outer periphery of said pan in spaced relationship to said pan, said metallic band having an integrally formed terminal portion thereon, and porcelain material disposed between said metallic band and the outer periphery of said pan.

References Cited in the file of this patent

UNITED STATES PATENTS

| 2,516,570 | Hartwig et al. | July 25, 1950 |
| 2,740,031 | Addink | Mar. 27, 1956 |
| 2,857,501 | Nitsche | Oct. 21, 1958 |

FOREIGN PATENTS

| 577,128 | Great Britain | May 6, 1946 |